(12) United States Patent
Thyamagondlu et al.

(10) Patent No.: US 12,332,801 B2
(45) Date of Patent: Jun. 17, 2025

(54) DESCRIPTOR CACHE EVICTION FOR MULTI-QUEUE DIRECT MEMORY ACCESS

(71) Applicant: Xilinx, Inc., San Jose, CA (US)

(72) Inventors: Chandrasekhar S. Thyamagondlu, Saratoga, CA (US); Tao Yu, Campbell, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 18/191,326

(22) Filed: Mar. 28, 2023

(65) Prior Publication Data

US 2024/0330191 A1 Oct. 3, 2024

(51) Int. Cl.
*G06F 12/08* (2016.01)
*G06F 12/0891* (2016.01)

(52) U.S. Cl.
CPC ...... *G06F 12/0891* (2013.01); *G06F 2212/27* (2013.01)

(58) Field of Classification Search
CPC .......... G06F 12/0891; G06F 2212/27
See application file for complete search history.

(56) References Cited

U.S. PATENT DOCUMENTS

| | | | |
|---|---|---|---|
| 6,701,393 B1 * | 3/2004 | Kemeny | G06F 12/124 711/E12.071 |
| 7,047,362 B2 * | 5/2006 | Kim | G06F 12/0897 711/E12.017 |
| 7,577,773 B1 | 8/2009 | Gandhi | |
| 9,292,436 B2 | 3/2016 | Wingard | |
| 9,952,991 B1 | 4/2018 | Bruce | |
| 10,474,610 B1 | 11/2019 | Schelle | |
| 10,983,920 B2 | 4/2021 | Thyamagondlu et al. | |
| 11,232,053 B1 | 1/2022 | Thyamagondlu et al. | |
| 11,500,779 B1 | 11/2022 | Mukherjee | |
| 11,983,128 B1 | 5/2024 | Xu | |
| 2003/0131198 A1 | 7/2003 | Wolrich | |
| 2006/0173970 A1 | 8/2006 | Pope | |
| 2008/0168259 A1 | 7/2008 | Biran | |
| 2011/0219208 A1 | 9/2011 | Asaad | |
| 2012/0254499 A1 | 10/2012 | Hashimoto | |
| 2014/0181410 A1 * | 6/2014 | Kalamatianos | G06F 12/121 711/133 |
| 2014/0195788 A1 | 7/2014 | Kalogeropulos | |
| 2014/0317357 A1 | 10/2014 | Kaplan | |
| 2014/0344485 A1 | 11/2014 | Dondini | |
| 2015/0180782 A1 | 6/2015 | Rimmer | |
| 2015/0347292 A1 | 12/2015 | Fujita | |
| 2016/0173398 A1 | 6/2016 | Reinig | |
| 2016/0292100 A1 * | 10/2016 | Olcay | G06F 13/28 |

(Continued)

*Primary Examiner* — Tasnima Matin
(74) *Attorney, Agent, or Firm* — Kevin T. Cuenot

(57) ABSTRACT

Evicting queues from a memory of a direct memory access system includes monitoring a global eviction timer. From a plurality of descriptor lists stored in a plurality of entries of a cache memory, a set of candidate descriptor lists is determined. The set of candidate descriptor lists includes one or more of the plurality of descriptor lists in a prefetch only state. An eviction event can be detected by detecting a first eviction condition including a state of the global eviction timer and a second eviction condition. In response to detecting the eviction event, a descriptor list from the set of candidate descriptor lists is selected for eviction. The selected descriptor list can be evicted from the cache memory.

18 Claims, 7 Drawing Sheets

(56) References Cited

U.S. PATENT DOCUMENTS

| | | |
|---|---|---|
| 2017/0131904 A1 | 5/2017 | Rajwade |
| 2020/0151120 A1 | 5/2020 | Thyamagondlu |
| 2021/0014177 A1 | 1/2021 | Kasichainula |
| 2021/0117360 A1 | 4/2021 | Kutch |
| 2021/0303570 A1* | 9/2021 | Kondiles ............. G06F 16/2471 |
| 2022/0005521 A1 | 1/2022 | Sethuraman |
| 2022/0374150 A1* | 11/2022 | Caprì .................... G06F 3/0611 |
| 2023/0185745 A1 | 6/2023 | Wu |
| 2023/0298128 A1 | 9/2023 | Puffer |
| 2024/0086356 A1 | 3/2024 | Ray |
| 2024/0118702 A1 | 4/2024 | Cella |
| 2024/0330213 A1 | 10/2024 | Thyamagondlu et al. |
| 2024/0330215 A1 | 10/2024 | Thyamagondlu et al. |
| 2024/0330216 A1 | 10/2024 | Thyamagondlu et al. |
| 2025/0004961 A1 | 1/2025 | Thyamagondlu |

\* cited by examiner

600

```
Monitor a global eviction timer
602
```
↓
```
From a plurality queues stored in a plurality of entries of a cache memory, determine a set of
candidate descriptor lists, wherein the set of candidate descriptor lists includes one or more of
the plurality of descriptor lists that are in the prefetch only state
604
```
↓
```
Detect eviction event by detecting a first eviction condition including a state of the global eviction
timer and a second eviction condition
606
```
↓
```
Select a descriptor list for eviction from the set of candidate descriptor lists
608
```
↓
```
Evict selected descriptor list from the cache memory
610
```

FIG. 6

DESCRIPTOR CACHE EVICTION FOR MULTI-QUEUE DIRECT MEMORY ACCESS

TECHNICAL FIELD

This disclosure relates to integrated circuits (ICs) and, more particularly, to descriptor cache eviction for a multi-queue direct memory access system of an IC.

BACKGROUND

Many modern computing environments include one or more host data processing systems (host systems) coupled to one or more peripheral devices. An example of a peripheral device is a hardware accelerator. The host system(s) may offload tasks to be performed by the peripheral devices. A peripheral device may include one or more compute units. To facilitate data movement between the host system(s) and the compute units of a peripheral device, the peripheral device may include a Multi-Queue Direct Memory Access (MQ-DMA) system. The MQ-DMA system provides non-blocking data movement between memory of the host system(s) that corresponds to different processes, functions, and/or applications executing therein and the compute units of the peripheral device.

In the usual case, the MQ-DMA system uses a descriptor queue for tracking certain DMA operations. Descriptor queues reside in memory of the host system(s). As such, descriptors must be fetched by the MQ-DMA system from the descriptor queues for use. With the descriptor queues residing in host memory, descriptor fetch operations can take significant time resulting in increased system latency and reduced bandwidth. With this in mind, descriptor fetch operations are an important aspect of efficient MQ-DMA system operation. For efficient data movement, the MQ-DMA system implements various strategies to fetch descriptors.

Certain descriptors may remain in the MQ-DMA system and go unused for a period of time. In many cases, the MQ-DMA system is able to actively manage only a limited set of descriptors. Keeping unused descriptors stored in the MQ-DMA system for too long prevents the MQ-DMA system from obtaining other descriptors that may be used to move data. Evicting (e.g., deleting) descriptors too quickly also may diminish performance of the MQ-DMA system as such descriptors may need to be re-fetched shortly after eviction thereby incurring unnecessary and additional latency. As such, implementing a strategy for evicting descriptors from the MQ-DMA system is an important aspect of MQ-DMA system operation and efficient data movement between host system(s) and the peripheral devices.

SUMMARY

In one or more example implementations, a method of evicting queues from a memory of a direct memory access system includes providing a global eviction timer. The method includes monitoring the global eviction timer. The method includes, from a plurality of descriptor lists stored in a plurality of entries of a cache memory, determining a set of candidate descriptor lists. The set of candidate descriptor lists includes one or more of the plurality of descriptor lists in a prefetch only state. The method includes detecting an eviction event by detecting a first eviction condition including a state of the global eviction timer and a second eviction condition. The method includes, in response to detecting the eviction event, selecting a descriptor list from the set of candidate descriptor lists for eviction. The selected descriptor list can be evicted from the cache memory.

The foregoing and other implementations can each optionally include one or more of the following features, alone or in combination. Some example implementations include all the following features in combination.

In some aspects, the first eviction condition includes detecting that the global eviction timer has expired.

In some aspects, the global eviction timer is programmable. For example, the global eviction timer may be set with a programmable amount of time. The amount of time may be user-specified.

In some aspects, the selected descriptor list is randomly selected from a set of candidate descriptor lists.

In some aspects, the cache memory is a content addressable memory (CAM).

In some aspects, the second eviction condition includes at least one of: determining that a number of free entries in a descriptor memory accessed by the direct memory access system is less than a threshold number of entries for the descriptor memory or determining that a number of the plurality of entries of the cache memory with prefetch mode enabled is larger than a threshold number of entries having prefetch mode enabled.

In some aspects, the threshold number of entries for the descriptor memory is programmable. For example, the threshold number of entries for the descriptor memory may be user-specified.

In some aspects, the threshold number of entries having prefetch mode enabled is programmable. For example, the threshold number of entries having prefetch mode enabled may be user-specified.

In some aspects, the second eviction condition includes determining that a local eviction timer of at least one descriptor list in the prefetch only state is expired. In that case, the set of candidate descriptor lists includes only the descriptor lists in the prefetch only state having an expired local eviction timer.

In some aspects, the local eviction timer is started in response to the descriptor list entering the prefetch only state and is reset in response to the descriptor list exiting the prefetch only state or being evicted.

In some aspects, the local eviction timer is programmable. For example, the local eviction timer may be set with a programmable amount of time. The amount of time for the local eviction timer may be user-specified.

In some aspects, the local eviction timer is one of a plurality of local eviction timers that corresponds, on a one-to-one basis, with the plurality of entries of the cache memory.

In one or more example implementations, a system such as a direct memory access system includes a multi-queue stream circuit. The multi-queue stream circuit includes a descriptor prefetch circuit configured to receive descriptor request events. The descriptor prefetch circuit includes a cache memory having a plurality of entries configured to store a plurality of descriptor lists. The descriptor prefetch circuit includes a global eviction timer. The descriptor prefetch circuit includes an eviction circuit configured to monitor the global eviction timer and, from the plurality of descriptor lists, determine a set of candidate descriptor lists, wherein the set of candidate descriptor lists includes one or more of the plurality of descriptor lists in a prefetch only state. The eviction circuit is configured to detect an eviction event by detecting a first eviction condition including a state of the global eviction timer and a second eviction condition and, in response to detecting the eviction event, selecting a descriptor list from the set of candidate descriptor lists for eviction. The eviction circuit is also configured to evict the selected descriptor list from the cache memory.

The foregoing and other implementations can each optionally include one or more of the following features, alone or in combination. Some example implementations include all the following features in combination.

In some aspects, the first eviction condition includes detecting that the global eviction timer has expired.

In some aspects, the global eviction timer is programmable. For example, the global eviction timer may be set with a programmable amount of time. The amount of time may be user-specified.

In some aspects, the eviction circuit randomly selects the selected descriptor list from the set of candidate descriptor lists.

In some aspects, the cache memory is a content addressable memory (CAM).

In some aspects, the second eviction condition includes at least one of: determining that a number of free entries in a descriptor memory accessed by the direct memory access system is less than a threshold number of entries for the descriptor memory or determining that a number of the plurality of entries of the cache memory with prefetch mode enabled is larger than a threshold number of entries having prefetch mode enabled.

In some aspects, the DMA system includes a plurality of local eviction timers corresponding to the plurality of entries of the cache memory. In that case, the second eviction condition includes determining that a local eviction timer of at least one descriptor list in the prefetch only state is expired. In that case, the set of candidate descriptor lists includes only descriptor lists in the prefetch only state having an expired local eviction timer.

In some aspects, the local eviction timer is programmable. For example, each global eviction timer may be set with a programmable amount of time. The amount of time for the local eviction timer may be user-specified.

In some aspects, the local eviction timer is started in response to the descriptor list entering the prefetch only state and is reset in response to the descriptor list exiting the prefetch only state or being evicted.

In some aspects, the local eviction timer is one of a plurality of local eviction timers that corresponds, on a one-to-one basis, with the plurality of entries of the cache memory.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 6 illustrates an example method of evicting queues from a cache memory as performed by the Card-to-Host stream circuit of FIG. 3.

DETAILED DESCRIPTION

Figure 1:
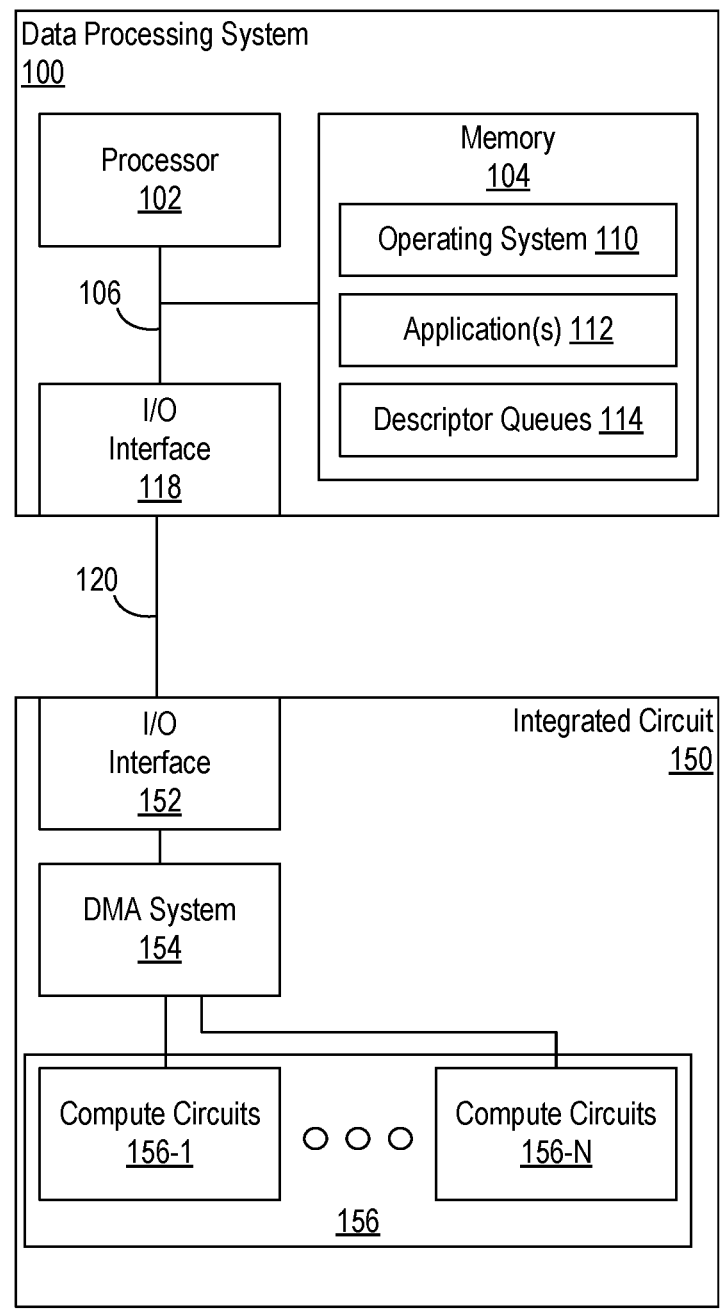
FIG. 1 illustrates an example computing system including a direct memory access (DMA) system.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to descriptor cache eviction for a Multi-Queue (MQ) Direct Memory Access (DMA) system (hereafter "MQ-DMA system"). In accordance with the inventive arrangements described within this disclosure, an MQ-DMA system is disclosed that is capable of efficiently managing descriptors, which facilitates efficient data movement between one or more host systems and a peripheral device in which the MQ-DMA system is disposed. The inventive arrangements described herein provide an eviction strategy that, when implemented, is capable of reducing the latency in processing descriptors and increasing the bandwidth achieved by the MQ-DMA system.

In one or more example implementations, the MQ-DMA system is capable of employing a variety of different eviction criteria in evaluating whether descriptor(s) are to be evicted from a cache memory of the MQ-DMA system. The cache memory is configured to store descriptor request events of active queues. In one aspect, the eviction criteria include timer information. The timer information may be derived from a global eviction timer used to ensure that at least a minimum amount of time (e.g., a gap) exists between successive evictions. The timer information also may be derived from one or more of a plurality of local eviction timers. The local eviction timers correspond to the entries of the cache memory used to track the active queues. For example, each entry of the cache memory is capable of storing a descriptor list and has a dedicated local eviction timer that is capable of tracking an amount of time that the respective entry is in a selected state.

In one or more example implementations, the eviction criteria can include additional information pertaining to the amount of data stored in various memories used and/or accessed by the MQ-DMA system. For example, the eviction criteria can include evaluating the number of free entries in a descriptor memory used by the MQ-DMA system. The eviction criteria can include evaluating a number of the active queues in the cache memory that are in a selected state. The various timers described and the information specifying the amount of data stored in the various memories may be used in determining a set of one or more descriptor lists, referred to as candidate descriptor lists, from which a descriptor list may be selected for eviction.

In block 304, the sytem detects the connected components in graph 352. Referring again to FIG. 4, the system has detected connected components 402 and 404 within graph 352. A connected component is a subgraph in which each pair of nodes is connected with each other via an edge.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example computing system in which the inventive arrangements may be implemented. As shown, the example computing system of FIG. 1 includes a data processing system 100 coupled to an IC 150. IC 150 is an example of a peripheral device of data processing system 100. For instance, IC 150 may be a hardware accelerator. Though not illustrated, IC 150 may be disposed on a circuit board. The circuit board may have volatile memory (not shown) and/or non-volatile memory (not shown) disposed thereon and coupled to IC 150.

In one aspect, the circuit board may be implemented with a card type of form factor allowing the circuit board to be inserted into a card slot, e.g., an available bus (e.g., Peripheral Component Interconnect Express (PCIe)) slot, of data processing system 100. It should be appreciated, however, that the circuit board may have any of a variety of different form factors so long as IC 150 is coupled to data processing system 100.

Data processing system 100 can include a processor 102, a memory 104, a bus 106, and an input/output (I/O) interface 118. Bus 106 couples processor 102 with memory 104 and I/O interface 118. Data processing system 100 is an example implementation of a host system. It should be appreciated that data processing system 100 is only one example implementation. Data processing system 100 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices. Data processing system 100 may include a plurality of host systems that are virtualized (e.g., virtual machines, containers, etc.).

Processor 102 is a hardware processor and may be implemented as one or more hardware processors. In an example, processor 102 is implemented as a CPU. Processor 102 may be implemented as one or more circuits capable of carrying out instructions contained in computer-readable program code or instructions. Processor 102 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 106 represents one or more of any of a variety of communication bus structures. By way of example, and not limitation, bus 106 may be implemented as a PCIe bus.

Data processing system 100 typically includes a variety of computer system readable media illustrated as memory 104. Such media may include computer-readable volatile and non-volatile media and computer-readable removable and non-removable media. For example, memory 104 can include computer-readable media in the form of volatile memory, such as random-access memory (RAM) and/or cache memory. Data processing system 100 also can include other removable/non-removable, volatile/non-volatile computer storage media. By way of example, memory 104 may include a storage system capable of reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each form of media can be connected to bus 106 by one or more data media interfaces. Memory 104 is an example of at least one computer program product.

Memory 104 is capable of storing program instructions that are executable by processor 102. For example, the program instructions can include an operating system 110, one or more application programs 112, other program code, and program data. In the example, memory 104 stores program data such as a plurality of descriptor queues 114. Processor 102, in executing the program instructions, is capable of performing the various operations described herein attributable to a host system.

It should be appreciated that data items used, generated, and/or operated upon by data processing system 100 are functional data structures that impart functionality when employed by data processing system 100. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

I/O interface 118 allows data processing system 100 to communicate with one or more peripheral devices such as IC 150. Examples of I/O interface 118 may include, but are not limited to, network cards, modems, network adapters, hardware controllers, etc. In an example implementation, I/O interface 118 includes a PCIe interface or adapter.

IC 150 may be implemented as any of a variety of different types of ICs. For example, IC 150 may be implemented as a System-on-Chip (SoC), an Application-Specific IC (ASIC), an adaptive IC such as a Field Programmable Gate Array (FPGA), or the like. An adaptive IC is an IC that may be updated subsequent to deployment of the device into the field. An adaptive IC may be optimized, e.g., configured or reconfigured, for performing particular operations after deployment. The optimization may be performed repeatedly over time to meet different requirements or needs.

In block 322, the system is capable of increasing the cost of using the shared routing resources that were freed from ripping up the routing in block 320. In performing routing, a cost metric is typically associated with different routing resources. Those routing resources in higher demand, e.g., needed by more nets, may be given a higher cost. The routing solution performs the mapping of nets to routing resources in a manner that seeks to minimize the total cost of the routing solution. Thus, increasing the cost of the freed routing resources, including those that were shared, will discourage the router from using such routing resources again and may particularly discourage sharing of such routing resource(s).

After block 322, method 300 continues to block 324 to determine whether there are any further cycles that require removal for the current routing solution (or routing iteration). In response to determining that one or more cycles remain in graph 356, method 300 loops back to block 320 to continue processing. Thus, for each cycle detected on graph 356, the system is capable of breaking the cycle by deleting the edge from graph 356 and ripping-up at least the portion of the routing solution corresponding to the deleted edge. In response to determining that no further cycles remain in graph 356, method 300 loops back to block 310 to continue processing where the circuit design 350, or the ripped-up portions of the routing, are re-routed. In block 310, the system re-routes at least the portion of the circuit design 350 for which the portion of the routing solution was ripped up and performs the routing or re-routing as the case may be using the increased cost(s) for the shared routing resource(s) freed from the ripping-up.

In general, DMA system 154 is configured to exchange data between data processing system 100 and IC 150. More particularly, DMA system 154 is configured to exchange data between one or more processes, applications, and/or functions executing in data processing system 100 and the various compute circuits 156 of IC 150 by way of communication link 120. Though one data processing system is illustrated, it should be appreciated that IC 150 may be accessed by and/or coupled to a plurality of different host systems including one or more virtualized systems by way of DMA system 154 communicating over a plurality of communication links.

In the example, DMA system 154 may be implemented entirely as hardened circuitry (e.g., ASIC circuitry), entirely using programmable circuitry (e.g., programmable logic such as FPGA programmable logic), or a combination of one or more hardened components/elements and one or more components/elements implemented in programmable circuitry.

Figure 2:
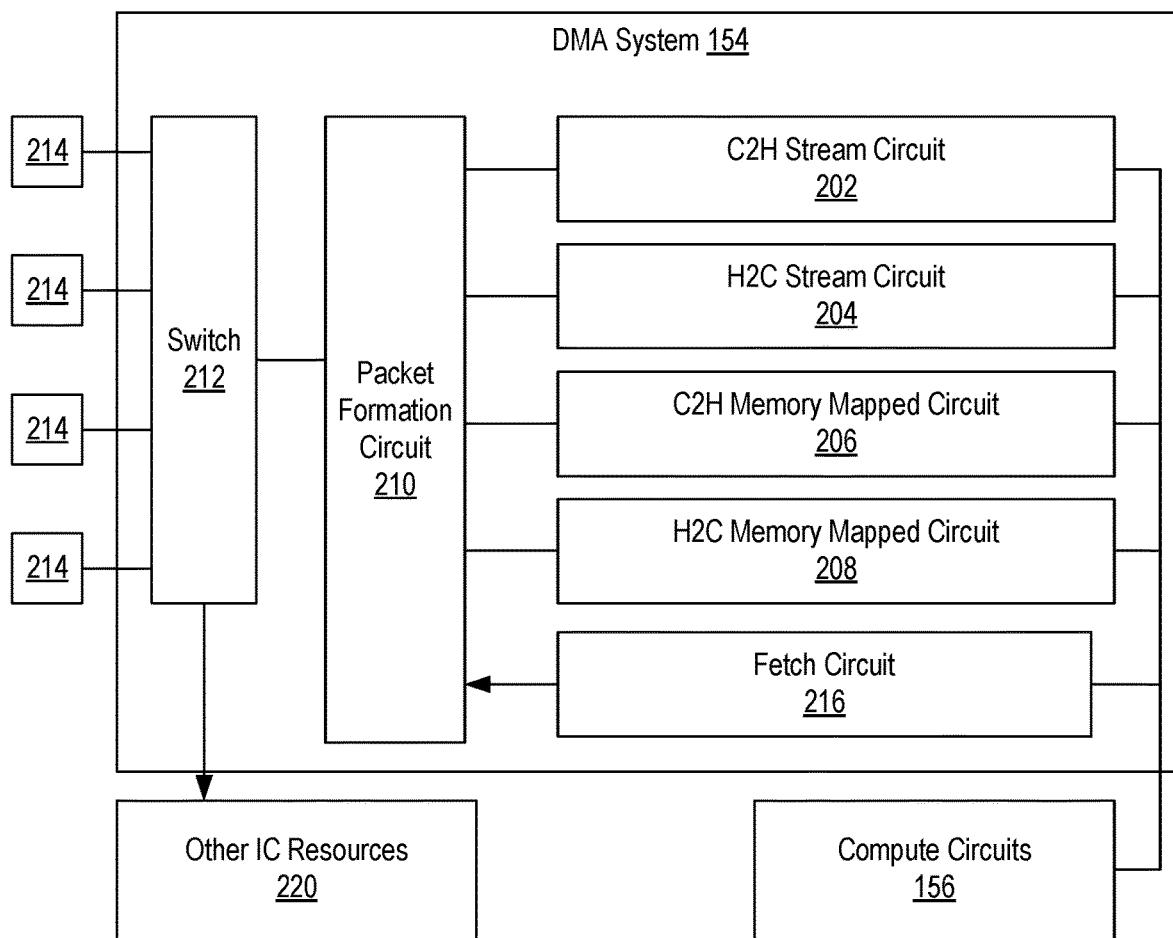
FIG. 2 illustrates an example implementation of the DMA system of FIG. 1.

FIG. 2 illustrates certain aspects of IC 150 and DMA system 154 in greater detail. In the example of FIG. 2, a more detailed example of DMA system 154 is illustrated. It should be appreciated that the particular architecture shown in FIG. 2 is provided for purposes of illustration and not limitation. For example, DMA system 154 may include fewer or more of the circuits illustrated and/or circuits of different varieties than shown.

In the example, DMA system 154 is an MQ-DMA system. For purposes of illustration, DMA system 154 includes an C2H stream circuit 202, an H2C stream circuit 204, a C2H memory mapped circuit 206, an H2C memory mapped circuit 208, and a fetch circuit 216. The term "C2H" means "card-to-host" referring to the case where IC 150 sends data to one or more host systems such as data processing system 100. The term "H2C" means "host-to-card" referring to the case where the host system sends data to IC 150. In the example, one or more of the circuits illustrated such as C2H stream circuit 202 may be implemented as multi-queued designs.

In the example, each of C2H stream circuit 202, H2C stream circuit 204, C2H memory mapped circuit 206, H2C memory mapped circuit 208, and fetch circuit 216 is coupled to packet formation circuit 210. Packet formation circuit 210 is capable of generating Transaction Layer Packets (TLPs) from data received from C2H stream circuit 202, H2C stream circuit 204, C2H memory mapped circuit 206, H2C memory mapped circuit 208, and/or fetch circuit 216. Packet formation circuit 210 is capable of translating TLPs from one or more host systems into a data format usable by C2H stream circuit 202, H2C stream circuit 204, C2H memory mapped circuit 206, H2C memory mapped circuit 208, and/or fetch circuit 216.

Packet formation circuit 210 is coupled to switch 212. Switch 212 is coupled to one or more other resources of IC 150 illustrated as "other IC resources" 220. In the example, DMA system 154 may be included in a larger system such as a System-on-Chip (SoC) implementation of IC 150 having a variety of different circuits and/or systems. In this regard, the other IC resources 220 may represent any of a variety of circuits and/or systems such as, for example, ASIC (e.g., hardened) circuit blocks, user circuitry implemented in programmable logic and/or circuitry, one or more processors capable of executing program code (e.g., a processor system), a programmable network-on-chip, a data processing array, and/or various combinations thereof.

Switch 212 is also coupled to one or more controllers 214. In some aspects, one or more or all (e.g., each) of controllers 214 may be implemented as a bus controller. An example of a bus controller is a PCIe controller. Each of controllers 214 may be configured to communicate over a respective port and communication link with a particular host system (not shown).

In the example of FIG. 2, packets from a network (not shown) may be sent to H2C stream circuit 204 and/or the various circuits represented by other IC resources 220. Similarly, H2C stream circuit 204 and/or other IC resources 220 may send packets to the network. This allows both the host system and the SoC to utilize the same driver for communication.

Figure 3:
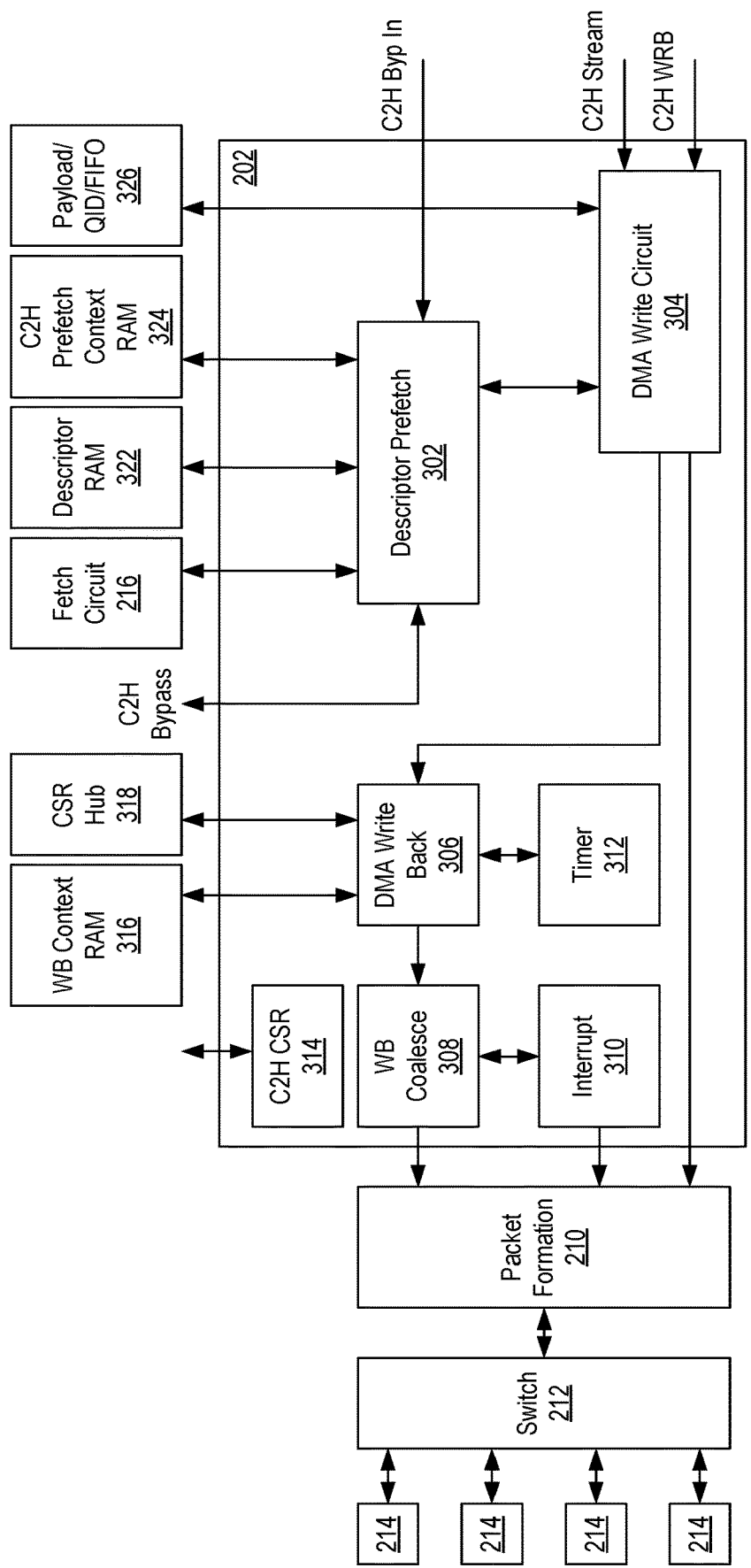
FIG. 3 illustrates an example implementation of a Card-to-Host stream circuit of the DMA system of FIG. 1.

FIG. 3 illustrates an example implementation of C2H stream circuit (hereafter "stream circuit") 202 coupled to controllers 214 by way of packet formation circuit 210 and switch 212. In the example, stream circuit 202 includes a descriptor prefetch 302, a DMA write circuit 304 (e.g., a C2H write circuit), a DMA write back 306, a write back (WB) coalesce 308, an interrupt 310, a timer 312, and a C2H control status register (CSR) 314. FIG. 3 also illustrates WB context RAM 316, CSR hub 318, descriptor RAM 322, C2H prefetch context RAM 324, and payload/QID/FIFO 326, which are implemented in IC 150.

In the example of FIG. 3, DMA write back 306 is capable of accessing WB context RAM 316 and CSR hub 318. WB context RAM 316 operates as a completion context RAM that is capable of storing the information needed to send completions such as, for example, the address of the host memory that stores the completions. CSR hub 318 may serve as an interface for accessing C2H CSR 314. C2H CSR 314 are control registers for stream circuit 202. Payload/QID/FIFO 326 is operable to store the payload and queue information of data packets received by stream circuit 202 from the user (e.g., from compute circuits 156).

Descriptor prefetch 302 includes a C2H bypass communication port and a C2H bypass input port (e.g., shown as C2H Byp In) that allows other circuits in IC 150, e.g., compute circuits 156, to access descriptor prefetch 302 without first accessing DMA write circuit 304. As shown, descriptor prefetch 302 is coupled to fetch circuit 216, descriptor RAM 322, and C2H prefetch context RAM 324. C2H prefetch context RAM 324 is operable to store prefetch information of a queue. For example, C2H prefetch context RAM 324 is capable of storing information such as the number of descriptors that get prefetched. DMA write circuit 304 is coupled to payload/QIF/FIFO 326, DMA write back 306, and packet formation circuit 210. DMA write circuit 304 has a C2H stream input port configured to receive data conveyed from compute circuits 156 to be sent to a destination by DMA system 154 and a C2H write back port (e.g., shown as C2H WRB).

DMA write back 306 is configured to handle write back operations that indicate that data has been provided to a host system. WB coalesce 308 is capable of operating on write backs. For example, WB coalesce 308 may coalesce or combine two or more write back operations into a single write back operation. DMA write back 306 is capable of writing write back information to WB context RAM 306. Timer 312 may be used by DMA write back 306 to control how often to perform write back operations. For example, after DMA write circuit 304 writes a payload of data to packet formation circuit 210 and DMA write back 306 performs a write back, an interrupt may be generated by interrupt 310 to the host system.

Figure 4:
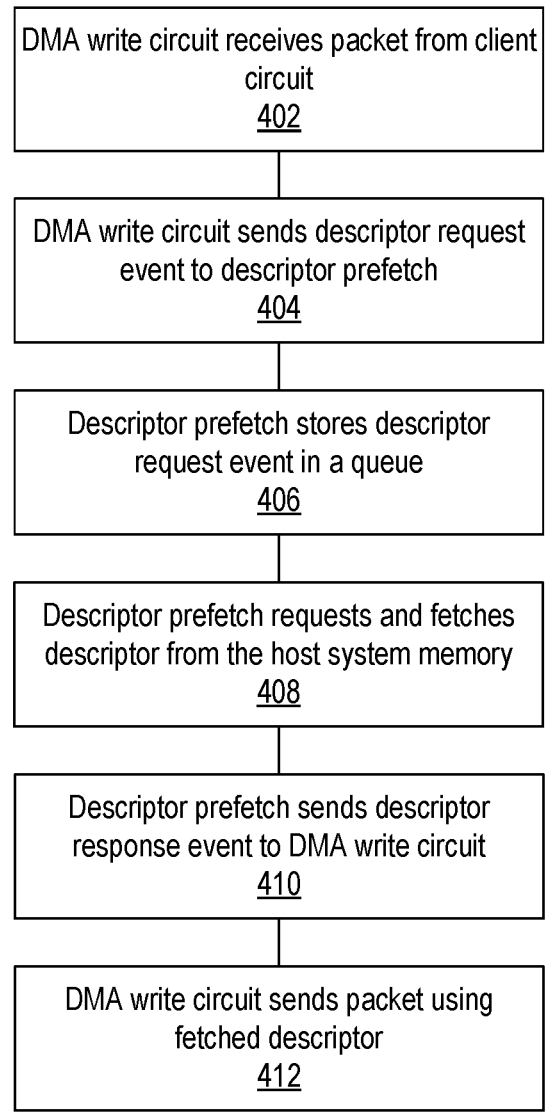
FIG. 4 illustrates an example method illustrating certain operative features of the DMA system of FIG. 1 including the Card-to-Host stream circuit.

FIG. 4 illustrates an example method 400 of certain operative features of DMA system 154 and of stream circuit 202. In block 402, DMA write circuit 304 receives a packet from a client circuit such as one of the compute circuits 156 of IC 150. The received packet may include queue identifying information such as a queue identifier that specifies the particular queue of the host system to which the packet belongs or corresponds. In one or more examples, the packet may specify other information such as a tag that may be mapped or used to derive the queue identifier and/or queue.

In an example implementation, DMA write circuit 304 receives the packet over a streaming interface. The streaming interface may be implemented as an "AXI" streaming interface in reference to a streaming interface implemented in accordance with the Advanced Microcontroller Bus Architecture (AMBA) extensible Interface (AXI) protocol. It should be appreciated that other similar and/or equivalent protocols, communication buses, bus interfaces, and/or interconnects may be used in lieu of AXI and that the various example circuit blocks and/or signals provided within this disclosure will vary based on the particular protocol, communication bus, bus interface, and/or interconnect that is used.

In block 404, DMA write circuit 304 sends a descriptor request event to descriptor prefetch 302. In block 406, in response to receiving the descriptor request event, descriptor prefetch 302 stores the descriptor request event in a descriptor list (e.g., a list with first-in-first-out ordering) within an internal memory described in greater detail in connection with FIG. 5. The internal memory (e.g., cache memory 512 of FIG. 5) includes a plurality of entries. Each entry may store a descriptor list. Each descriptor list is capable of storing one or more descriptor request events having a same identifier. For example, a descriptor list may be created in an available entry of the internal memory in response to determining that a descriptor list having a same identifier as the received data does not exist therein. The descriptor request event is added to the newly created descriptor list. Otherwise, the descriptor request event is added to an existing descriptor list of the internal memory that has a same identifier as the received data. Being organized according to identifiers, each descriptor list stored in an entry will correspond to a particular or same queue of the host system.

In block 408, descriptor prefetch 302 sends a request for a descriptor to fetch circuit 216. Fetch circuit 216 fetches one or more descriptors from host memory. The descriptor(s), as fetched by fetch circuit 216 from appropriate descriptor queues 114 of the host memory, are provided to descriptor prefetch 302, which may store the descriptor(s) in descriptor RAM 322. In this regard, descriptor prefetch 302 may be said to have fetched the descriptor(s). In block 410, descriptor prefetch 302 sends a descriptor response event to DMA write circuit 304 by way of a descriptor response interface coupled to descriptor prefetch 302. The descriptor response event indicates that one or more descriptors have been obtained in response to the previously received descriptor request event. At this point, DMA write circuit 304 has received data to be sent via a DMA operation and has a descriptor for use in sending the data. The descriptor specifies information such as the destination address to which the data is to be provided and the address of the memory where the data to be transferred is currently stored.

In block 412, DMA write circuit 304 sends data to packet formation circuit 210 using the descriptor obtained by descriptor prefetch 302. Packet formation circuit 210 may form a TLP from the received data and forward the TLP to switch 212. Switch 212 routes the TLP to a selected controller 214 to continue to memory of a designated host system (e.g., memory 104).

Figure 5:
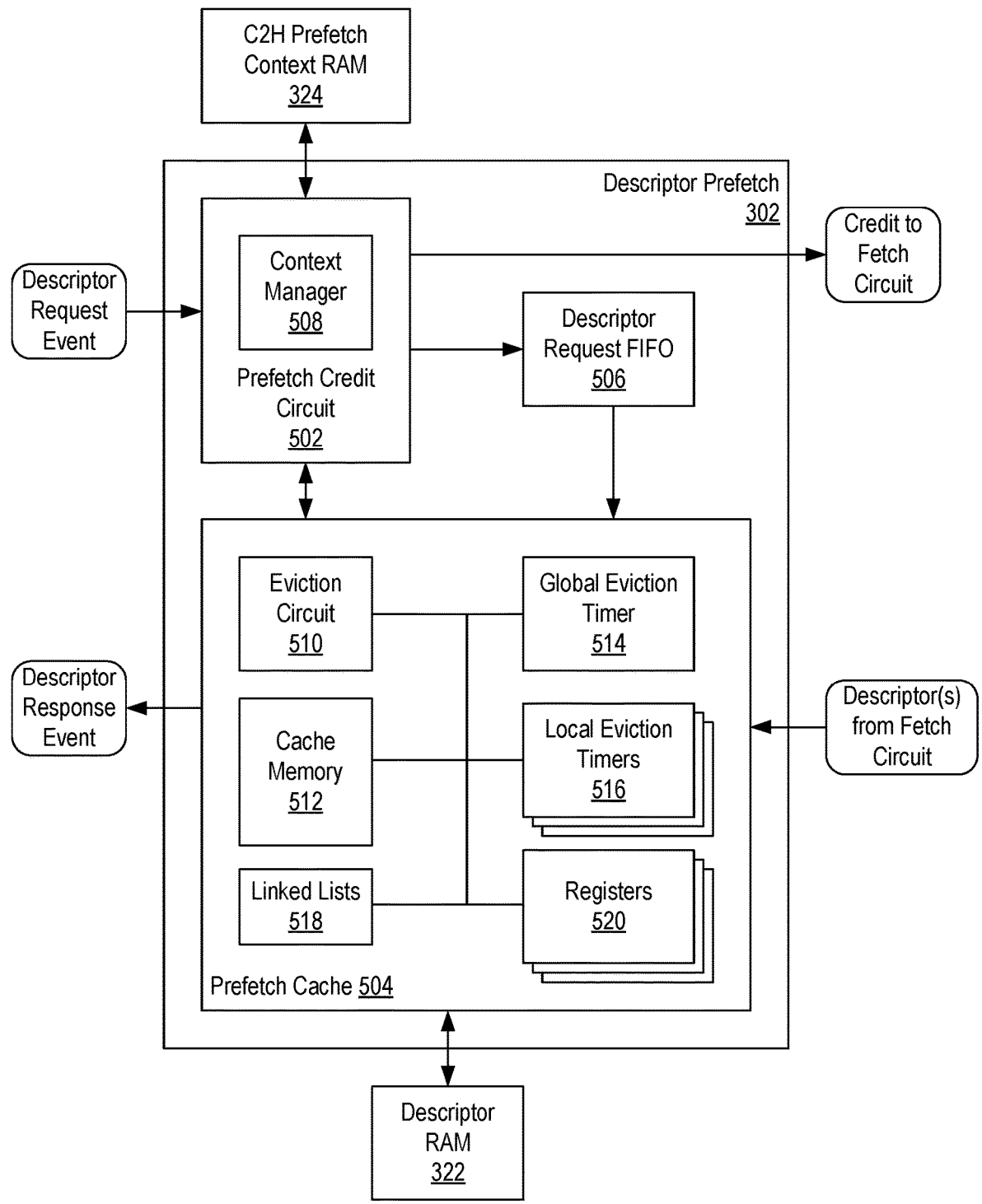
FIG. 5 illustrates an example implementation of a descriptor prefetch circuit of the Card-to-Host stream circuit of FIG. 3.

FIG. 5 illustrates an example implementation of descriptor prefetch 302. In the example, descriptor prefetch 302 includes a prefetch credit circuit 502 coupled to a prefetch cache 504. Prefetch credit circuit 502 may be coupled directly to prefetch cache 504 and also coupled to prefetch cache 504 by way of a descriptor request First-In-First-Out (FIFO) 506. Prefetch credit circuit 502 includes a context manager 508. Prefetch cache 504 includes an eviction circuit 510 coupled to a cache memory 512, a global eviction timer 514, a plurality of local eviction timers 516, and registers 520. Registers 520 may include one or more configuration registers capable of storing configuration data and one or more status registers capable of storing data such as counter information and/or occupancy information. In one example, registers 520 may be a subset of, or included within, C2H CSR 314. In the example, prefetch cache 504 also includes or stores a plurality of linked lists 518 (e.g., where linked lists 518 represents the circuitry configured to store and/or access linked lists).

In the example of FIG. 5, prefetch credit circuit 502 receives a descriptor request event from DMA write circuit 304. DMA write circuit 304, for example, may receive data and, in response, submit a descriptor request event to prefetch credit circuit 502. Prefetch credit circuit 502 is capable of issuing credit to fetch circuit 216 and placing the descriptor request event as received from DMA write circuit 304 into descriptor request FIFO 506.

In response to the descriptor request event received via descriptor request FIFO 506, eviction circuit 510 adds the descriptor request event to a descriptor list having the same identifier. That is, if no descriptor list exists in cache memory 512 with the same identifier as the descriptor request event (e.g., carried over and/or determined from the received data), eviction circuit 510 creates a descriptor list with the same identifier in a free or available entry of cache memory 512 and adds the descriptor request event to the newly created descriptor list. If a descriptor list having the same identifier as the descriptor request event does exist in cache memory 512, eviction circuit 510 adds the descriptor request event to that descriptor list. In any case, the descriptor request event is added to a descriptor list having the same identifier as specified by the data received by DMA write circuit 304.

The identifier, as discussed, specifies or corresponds to a particular queue in host system memory. Thus, a given entry or descriptor list stored in an entry may be said to correspond to the particular queue of the host memory indicated by the identifier. In an example implementation, cache memory 512 may be implemented as a Content Addressable Memory (CAM). Cache memory 512 is capable of storing those descriptor lists that are active within DMA system 154. Each descriptor list may be stored in an entry available within cache memory 512.

The number of active queues that may be stored in cache memory 512, e.g., the number of queues represented by identifiers of descriptor lists of cache memory 512, may be a fraction of the number of queues that DMA system 154 is capable of handling. For purposes of illustration and not limitation, DMA system 154 may be capable of handling approximately 4,098 C2H queues. Cache memory 512 may include 128 entries thereby enabling cache memory 512 to store free descriptors for 128 different queues. The numbers provided herein as to the number of queues that may be handled and/or may be active are for purposes of illustration only and may be smaller or larger depending on the particular implementation of DMA system 154. In general, however, cache memory 512 stores fewer queues than DMA system 154 is capable of handling. This makes managing queues and their eviction from cache memory 512 an important aspect of the operation of DMA system 154.

In the example, prefetch cache 504 receives descriptor(s) from fetch circuit 216. The received descriptor may be logged (e.g., added) to a particular linked list of linked lists 518 and stored in descriptor RAM 322. In general, linked lists 518 store a (e.g., one) linked list for each different entry (e.g., and as such for each descriptor list) of cache memory 512. Prefetch cache 504 provides a descriptor response event to DMA write circuit 304 in response to obtaining the descriptor(s) from fetch circuit 216. For example, descriptors may be stored or logged in linked lists 518 in a particular linked list corresponding to the particular descriptor list (e.g., and as such to which the descriptor belongs. In one aspect, the descriptors may be logged into a particular linked list based on a pre-allocated tag for the queue (e.g., wherein the pre-allocated tag may be specified in the received packet and used to determine or derive the queue identifier). Each descriptor list may, for example, point to a particular and corresponding linked list in linked lists 518.

In the example, linked lists 518 store the free descriptors needed to DMA the received packet to host memory. The descriptors in linked lists 518 can include prefetched descriptors and descriptors needed for the packets in DMA write circuit 304. Cached queues, e.g., in reference to the descriptor lists stored in cache memory 512 that correspond to queues, may have varying numbers of descriptors. If, for example, only one queue is active, then the entire linked lists 518 have descriptors for one queue. If, for example, more than one queue is active, then linked lists 518 have descriptors for more than one queue.

Each descriptor list (e.g., corresponding to a queue in host memory) remains in cache memory 512 occupying one of the 128 entries therein until such time that eviction circuit 510 deletes (e.g., evicts) the descriptor list from cache memory 512. A descriptor list may be evicted by marking the entry occupied by the descriptor list as free or available. The descriptors fetched and stored in descriptor RAM 322 are stored in descriptor RAM 322 until consumed or the descriptor list corresponding to the descriptors is evicted. Evicting a descriptor list has the effect of deleting or freeing the memory used to store the descriptors for the evicted descriptor list. Within this disclosure, it should be appreciated that reference to a descriptor list may also refer to the particular queue in host memory from which descriptors are obtained. Accordingly, references to evicting a descriptor list, which corresponds to a particular queue in host memory, may be referred to as "evicting the queue." Determining an appropriate descriptor list to evict and an appropriate time to evict the descriptor list can significantly affect the performance of DMA system 154.

For example, if a descriptor list is evicted from cache memory 512 too quickly, prefetch cache 504 will be forced to recreate the descriptor list in cache memory 512 in response to receiving further data with the same identifier as the descriptor list that was just evicted. This causes unnecessary latency in DMA system 154 (e.g., the eviction and subsequent re-creation of the descriptor list). Keeping a descriptor list in cache memory 512 for too long when no data is received for the descriptor list only serves to occupy an entry of cache memory 512 that would otherwise be used to handle a different descriptor list corresponding to a different queue for which data is being received. Further, any descriptors affiliated with the unused descriptor list that are stored in descriptor RAM 322 consume space in descriptor RAM 322 that is not available for other descriptors. This too degrades the performance of DMA system 154.

Entries of cache memory 512 may be placed in different states (e.g., as reflected in the various entries). These states include, but are not limited to, INV, FETCH, PFCH, and PFCH_ONLY. The following is a general description of the different states through which entries of cache memory 512 may pass through during operation of DMA system 154.

INV: indicates that the entry of cache memory 512 is free and available for storing a new descriptor list corresponding to a new queue.

FETCH: indicates that an entry of cache memory 512 is storing a descriptor list corresponding to an active queue for which descriptors are being fetched (also referred to as an "active queue"). FETCH also indicates that the prefetch mode is off for the descriptor list occupying this entry in cache memory 512.

PFCH: indicates that the entry of cache memory 512 has an active queue (e.g., descriptor list) that is fetching descriptors. PFCH indicates that the prefetch mode is on for the descriptor list occupying this entry of cache memory 512.

PFCH_ONLY: indicates that the entry of cache memory 512 has an active queue that has already serviced the existing packets. PFCH_ONLY indicates that any descriptors of the descriptor list are only prefetch descriptors.

Within this disclosure, the creation or storage of a descriptor list in an entry of cache memory 512 means that the descriptor list (e.g., or queue corresponding thereto) may be referred to as having the same state as the entry in some cases.

For purposes of illustration, consider the following example of the prefetch mode of operation. For a given queue, as a first packet of data for the queue is received, only one descriptor may be needed to move the packet of data. With the prefetch mode turned on for the queue, a descriptor is fetched for the data along with an additional number of descriptors. The number of descriptors prefetched may be a user programmable number of descriptors (e.g., as specified in registers 520). The additional descriptors are not needed to process the data that has been received. Rather, the additional descriptors (e.g., the prefetched descriptors) are available for processing data packets that may be received for the queue in the future.

Thus, the descriptor list corresponding to the queue is maintained in cache memory 512 and the prefetched descriptors are stored in descriptor RAM 322. The entry in cache memory 512 may point to the particular linked list of linked lists 518 for the queue, with that particular linked list pointing to the prefetched descriptors stored in descriptor RAM 322. If further data is received for the queue, the additional data may be processed using the prefetched descriptors thereby reducing latency in processing the data since descriptors need not be fetched from host memory to process the newly received data. Fetching descriptors may take significant time. If, however, no further data is received for the queue, the descriptor list corresponding to the queue still occupies an entry in cache memory 512 and the prefetched descriptors continue to occupy space in descriptor RAM 322.

With the foregoing in mind, entries (e.g., queues) with the prefetch mode turned off may transition through states such as INV, to FETCH, to INV. Entries (e.g., queues) with the prefetch mode turned on may transition through states such as INV, to PFCH, to PFCH_ONLY, to INV. Referring to the entries with prefetch mode turned on, for the time that the entry is in the PFCH_ONLY state, the entry and any descriptors fetched for the queue corresponding to the entry are not being utilized by DMA system 154.

In one or more example implementations, one or more counters may be included in registers 520 that may be used to track the number of descriptors that have been returned for a given queue and/or the number of descriptors that have been used by a given queue. This allows prefetch cache 504 to track descriptor usage. Eviction circuity 510 may include the logic that maintains the counters. The state of the counters may be used by eviction circuit 510 to determine the particular state of a given entry/queue (e.g., INV, PFCH_ONLY).

In another example, the number of descriptor lists that are in the prefetch mode of operation may be tracked. In one example, the number of descriptor lists in the prefetch mode may be tracked by a counter within registers 520 as managed by eviction circuit 510. In another example, C2H prefetch context RAM 324 may include information indicating which descriptor lists are operating in the prefetch mode. In that case, eviction circuit 510 may access C2H prefetch context RAM 324 to obtain that information.

In the example of FIG. 5, global eviction timer 514 is configured to count down from a predetermined value to determine whether a minimum amount of time from a prior or most recent eviction of a queue from cache memory 512 has elapsed. Global eviction timer 514 ensures that a minimum amount of time or gap occurs between successive evictions of descriptor lists from cache memory 512. Once global eviction timer 514 expires, global eviction timer 514 may remain in the expired state until such time that another eviction of a descriptor list from cache memory 512 occurs. In response to eviction circuit 510 evicting a descriptor list from cache memory 512, eviction circuit 510 may reset and restart global eviction timer 514. Accordingly, global eviction timer 514 begins counting down from the predetermined value anew. The value from which the global eviction timer begins counting down may be programmable (e.g., user-specified). This provides users with the ability to tune or set the gap between successive evictions. That is, the global eviction timer 514 may be programmed with a user-specified amount of time (e.g., as specified in a configuration register of registers 520).

In addition, global eviction timer 514 helps to maintain free entries in cache memory 512. The availability of free entries in cache memory 512 avoids the latency that may occur in cases where prefetch cache 504 is full and one or more new packets require packet descriptors that do not exist in the cache memory 512.

In the example, there may be one local eviction timer 516 for each entry of cache memory 512. For example, in the case where cache memory 512 includes 128 entries, prefetch cache 504 includes 128 local eviction timers 516. As such, there may be a one-to-one correspondence between entries of cache memory 512 (and as such descriptor lists and the corresponding queues stored in cache memory 512) and local eviction timers 516. Local eviction timers 516 are configured to count down from a predetermined value to determine whether entries of cache memory 512 are in the PFCH_ONLY state for a minimum amount of time. The predetermined value may be a programmable value and may be different from that used for the global timer. That is, each local eviction timer 516 may be programmed with a specified (e.g., user-specified) amount of time. This provides users with the ability to tune or set the amount of time that a given entry/queue is in the PFCH_ONLY state prior to being considered for eviction. The value may be specified in a configuration register of registers 520. Within this disclosure, the association of an entry of cache memory 512 with a local eviction timer means that the descriptor list (e.g., and corresponding queue) stored or maintained in that entry is also associated with the same local eviction timer as the entry.

For example, in response to a given entry of cache memory 512 entering the PFCH_ONLY state, eviction circuit 510 starts the local eviction timer for the entry. The local eviction timer begins counting down from the predetermined value. In response to the entry exiting the PFCH_ONLY state, eviction circuit 510 resets the local eviction timer. If the local eviction timer expires, the local eviction timer may remain in the expired state until such time that the corresponding entry in cache memory 512 exits the PFCH_ONLY state or the descriptor list stored in the cache is evicted from cache memory 512. Upon the entry exiting the PFCH_ONLY state or the descriptor list of the entry being evicted, eviction circuit 510 resets the local eviction timer. The local eviction timer is not started until such time that another descriptor list is stored in the entry and the entry enters the PFCH_ONLY state.

In the case of some conventional queue eviction techniques, timers, whether global or local, are not utilized. With such conventional approaches, the possibility exists that the DMA system will spend an increased amount of time performing evictions given that no global timer is used to check the elapsed time since the last eviction of a queue before undertaking a new eviction of a queue. Use of global eviction timer 514 prevents DMA system 154 from spending excessive time evicting queues from cache memory 512. With conventional approaches lacking timers, the amount of time that a given entry (e.g., and as such the queue of the entry) spends in a selected state such as the PFCH_ONLY state is unknown. While in the PFCH_ONLY state, the queue is active and one or more descriptors are stored in descriptor RAM 322, yet no data has been received to consume the descriptors. By tracking those queues in the PFCH_ONLY state, the particular queue to be evicted may be one that has been in the PFCH_ONLY state for at least a minimum amount of time.

As discussed, registers 520 are capable of storing a variety of different values that may be used by eviction circuit 510 in determining whether to evict a queue from cache memory 512. For example, registers 520 may store values specifying minimum and/or maximum numbers of entries (e.g., queues) in cache memory 512 that are in the various states mentioned (e.g., INV, PFCH, and/or PFCH_ONLY, etc.) optionally the various threshold values used herein for comparison, the number of descriptor lists with prefetch mode enabled, and/or available capacity of descriptor RAM 322. Registers 520 may be programmable so that a user and/or user application may tune the performance of DMA system 154 to the particular application(s) and/or function(s) being performed in IC 150. That is, the various thresholds used, including initial timer values, may be user specified.

FIG. 6 illustrates an example method 600 of evicting queues from a cache memory as performed by the stream circuit 202. In block 602, the global eviction timer 514 is monitored. In block 604, from a plurality of descriptor lists stored in a plurality of entries of cache memory 512, a set of candidate descriptor lists (e.g., candidate queues in reference to the queues associated with the respective candidate lists) is determined. The set of candidate descriptor lists includes, or corresponds to, one or more of the plurality of descriptor lists that are in the prefetch only state. In block 606, an eviction event is detected by detecting a first eviction condition including a state of the global eviction timer and a second eviction condition. In block 608, in response to detecting the eviction event, a descriptor list is selected from the set of candidate descriptor lists for eviction. In block 610, the selected descriptor list can be evicted from cache memory 512.

Figure 7:
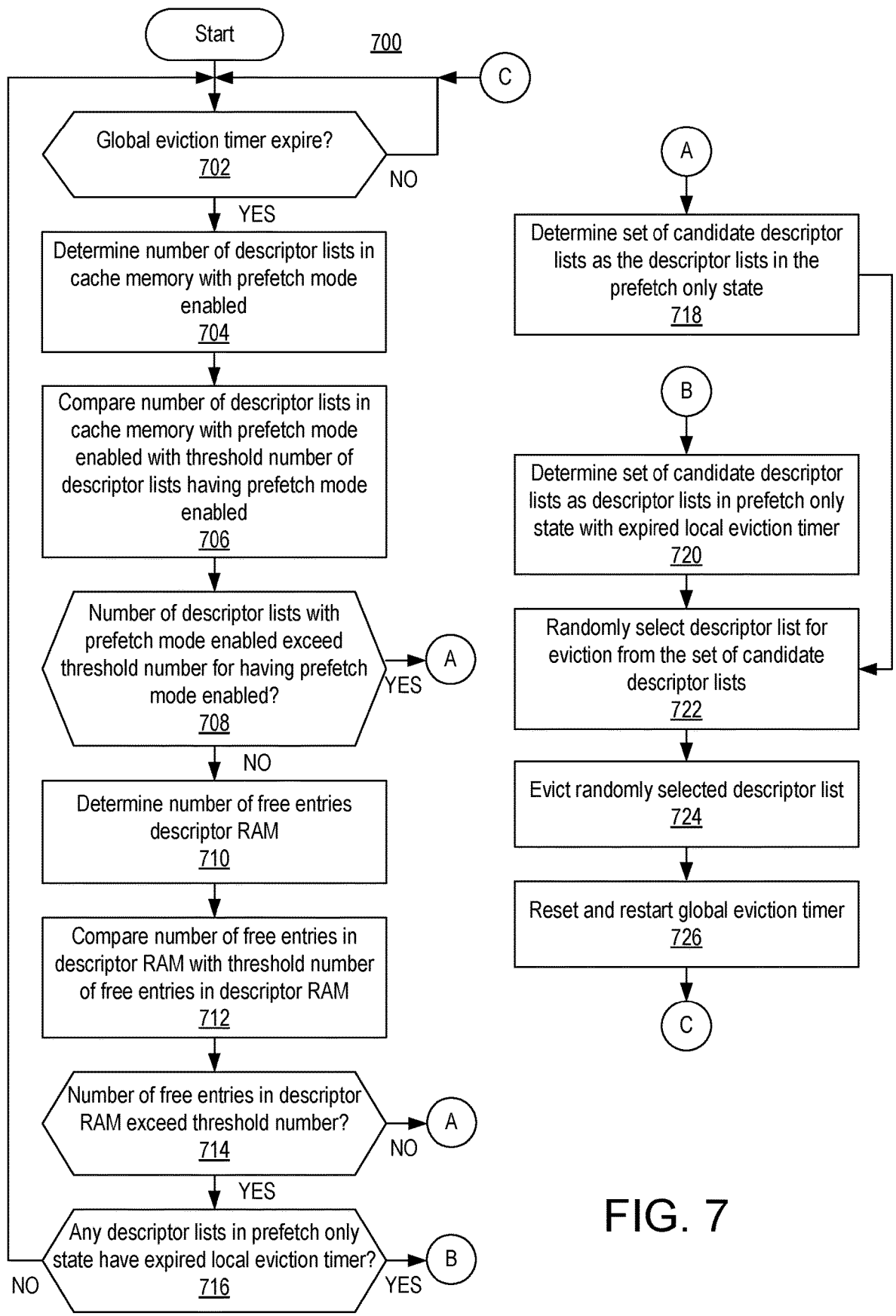
FIG. 7 illustrates another example method of evicting queues from a cache memory as performed by the Card-to-Host stream circuit of FIG. 3.

FIG. 7 illustrates another example method 700 of evicting queues from cache memory 512 of prefetch cache 504. In the example of FIG. 7, DMA system 154 and stream circuit 202 may be operating. For purposes of illustration, global eviction timer 514 may be running (e.g., counting down from the predetermined value). Further, one or more of local eviction timers 516 may have been started and counting down from predetermined values to track the amount of time that one or more corresponding entries of cache memory 512 are in the PFCH_ONLY state. It should be appreciated that example method 700 may be performed by eviction circuit 510 concurrently and/or serially with other operations performed by eviction circuit 510 and/or with other components of DMA system 154.

In block 702, eviction circuit 510 determines whether global eviction timer 514 has expired. If global eviction timer 514 has expired, then the minimum amount of time between consecutive evictions of queues from cache memory 512 has passed and a further queue may be evicted from cache memory 512 so long as the additional conditions, e.g., eviction criteria, described below are met. In response to determining that global eviction timer 514 has expired, method 700 continues to block 704. In response to determining that global eviction timer 514 has not expired, method 700 loops back to continue checking the state of global eviction timer 514.

In block 704, eviction circuit 510 determines a number of the descriptor lists from cache memory 512 that have the prefetch mode enabled (e.g., the queue is in the PFCH state). That is, eviction circuit 510 determines the number of descriptor lists in cache memory 512 that have prefetch mode enabled. In block 706, eviction circuit 510 compares the number of descriptor lists with the prefetch mode enabled with a threshold number of descriptor lists having prefetch mode enabled. In one example, the threshold number of descriptor lists having prefetch mode enabled may be stored in registers 520. The threshold number of descriptor lists having the prefetch mode enabled may be user programmable.

In block 708, in response to determining that the number of descriptor lists with prefetch mode enabled exceeds the threshold number of descriptor lists having prefetch mode enabled, method 700 continues to block 718 to implement the eviction procedure. In response to determining that the number of descriptor lists with prefetch mode enabled does not exceed the threshold number of descriptor lists having prefetch mode enabled, method 700 continues to block 710. The determination made in connection with blocks 704, 706, and 708 is an example of a second condition to be met in addition to the expiration of the global eviction timer to detect an eviction event.

In block 710, eviction circuit 510 determines a number of free entries in descriptor RAM 322. Each entry in descriptor RAM 322 is capable of storing a descriptor. Accordingly, the number of free entries in descriptor RAM 322 indicates the number of additional descriptors that may be stored in descriptor RAM 322. In block 712, eviction circuit 510 compares the number of free entries in descriptor RAM 322 with a threshold number of free entries for descriptor RAM 322. The threshold number of free entries for descriptor RAM 322 may be stored in registers 520. In one aspect, the number of free entries for descriptor RAM 322, as stored in registers 520, may be user programmable.

In block 714, eviction circuit 510 determines whether the number of free entries in descriptor RAM 322 exceeds the threshold number of free entries for descriptor RAM 322. If the number of free entries in descriptor RAM 322 does not exceed the threshold number of entries of descriptor RAM 322, eviction circuit 510 considers the number of available entries in descriptor RAM 322 to be below an acceptable level for efficient operation of DMA system 154. Accordingly, in response to determining that the number of free entries in descriptor RAM 322 does not exceed the threshold number of entries, method 700 proceeds to block 718 to implement the eviction procedure. In response to determining that the number of free entries in descriptor RAM 322 exceeds the threshold number, method 700 may continue to block 716. The determination made in connection with blocks 710, 712, and 714 is another example of a second condition to be met in addition to the expiration of the global eviction timer to detect an eviction event.

In block 716, eviction circuit 510 determines whether any of the descriptor lists in the PFCH_ONLY state has an expired local eviction timer 516. Eviction circuit 510 determines the number of descriptor lists in the PFCH_ONLY state and evaluates the state of the local eviction timer of each such descriptor list. In response to determining that a descriptor list in the PFCH_ONLY state (e.g., at least one such queue) has an expired local eviction timer, method 700 continues to block 720 to implement the eviction procedure. In response to determining that no descriptor list in the PFCH_ONLY state has an expired local eviction timer, method 700 loops back to block 702 to continue operation. In this case, the eviction procedure is not implemented.

In block 718, eviction circuit 510 determines a set of candidate descriptor lists from which a descriptor list is selected for eviction. In the example of FIG. 7, the set of candidate descriptor lists are those descriptor lists (e.g., corresponding queues) that are in the PFCH_ONLY state. After block 718, method 700 continues to block 722.

In block 720, eviction circuit 510 determines a set of candidate descriptor lists from which a descriptor list is selected for eviction. In the case of block 720, the set of candidate descriptor lists are those descriptor lists that are in the PFCH_ONLY state and have an expired local eviction timer. Thus, the set of candidate descriptor lists may differ based on whether block 718 or 720 is performed. After block 720, method 700 continues to block 722.

In block 722, from the set of candidate descriptor lists, eviction circuit 510 randomly selects a descriptor list for eviction. For example, eviction circuit 510 may include circuitry that implements a randomization function used in selecting a particular descriptor list (and thus corresponding queue) from the set of candidate descriptor lists as discussed. If the set of candidate descriptor lists includes only a single descriptor list, then that single descriptor list may be selected for eviction and randomization is not required or implemented.

Without using a random selection process, a sequential process may be applied. Use of randomization in selecting the queue to be evicted provides a selection technique that is fairer than sequential techniques. Use of randomization also reduces the complexity of eviction circuit 510 in that tracking mechanisms for determining the last queue evicted need not be maintained or tracked.

In block 724, eviction circuit 510 evicts the descriptor list selected in block 722 from cache memory 512. In evicting a descriptor list from cache memory 512, the entry occupied by the descriptor list is marked as available (INV). As noted, the descriptor list stored in cache memory 512 may store a pointer to a linked list 518 for the descriptor list being evicted. Eviction circuit 510 is capable of locating the corresponding linked list of linked lists 518 indicated by the entry being freed or marked as available and marking each entry in descriptor RAM 322 specified by the linked list for the evicted descriptor list (e.g., that stores a prefetched descriptor) as available. In an example implementation, eviction circuit 510 may notify context manager 508 of the particular entries of RAM 322 that have been marked as available. Context manager 508 may update C2H prefetch context RAM 324 to indicate which entries of descriptor RAM 322 have been marked as available (e.g., have had their descriptors evicted or purged) and, as such, are available for storing new descriptors.

In block 726, eviction circuit 510 may reset and restart global eviction timer 514. As noted, local eviction timers 516 may be set, started, and/or reset as previously discussed in connection with the particular state that the corresponding entry/queue is in. After block 726, method 700 may loop back to block 702 and continue the processing described for evicting queues from stream circuit 202.

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "data processing system" means one or more hardware systems configured to process data, each hardware system including at least one hardware processor and memory. The hardware processor is programmed with computer-readable instructions that, upon execution, initiate operations.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "individual" and "user" each refer to a human being.

As defined herein, the term "hardware processor" means at least one hardware circuit. The hardware circuit may be configured to carry out instructions contained in program code. The hardware circuit may be an integrated circuit. Examples of a hardware processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc., may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the terms "computer-readable program code," "computer readable program instructions," "program code," and "program instructions" are used interchangeably. Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, of evicting queues from a memory of a direct memory access system, the method, comprising:
   monitoring a global eviction timer configured to count down from a predetermined value responsive to a prior eviction event of a cache memory;
   from a plurality of descriptor lists stored in a plurality of entries of a cache memory, determining a set of candidate descriptor lists including one or more descriptor lists of a plurality of descriptor lists in the cache memory in a prefetch only state;
   detecting an eviction event by detecting expiration of the global eviction timer and one or more eviction conditions, wherein the expiration of the global eviction timer indicates passage of a minimum amount of time since the prior eviction event;
   in response to detecting the eviction event, selecting a descriptor list from the set of candidate descriptor lists for eviction; and
   evicting the selected descriptor list from the cache memory.

2. The method of claim 1, wherein the global eviction timer is set with a programmable amount of time.

3. The method of claim 1, wherein the selected descriptor list is randomly selected from the set of candidate descriptor lists.

4. The method of claim 1, wherein the cache memory is a content addressable memory (CAM).

5. The method of claim 1, wherein the eviction condition includes at least one of:
   determining that a number of free entries in a descriptor memory accessed by the direct memory access system is less than a threshold number of entries for the descriptor memory; or
   determining that a number of the plurality of entries of the cache memory with a prefetch mode enabled is larger than a threshold number of entries having the prefetch mode enabled.

6. The method of claim 5, wherein the threshold number of entries for the descriptor memory is programmable.

7. The method of claim 5, wherein the threshold number of entries having the prefetch mode enabled is programmable.

8. The method of claim 1, wherein the eviction condition includes:
   determining that a local eviction timer of at least one descriptor list in the prefetch only state is expired;
   wherein the set of candidate descriptor lists includes only the descriptor lists in the prefetch only state having an expired local eviction timer.

9. The method of claim 8, wherein the local eviction timer is started in response to the descriptor list entering the prefetch only state and is reset in response to the descriptor list exiting the prefetch only state or being evicted.

10. The method of claim 8, wherein the local eviction timer is one of a plurality of local eviction timers that corresponds, on a one-to-one basis, with the plurality of entries of the cache memory.

11. A direct memory access system having a multi-queue stream circuit, the multi-queue stream circuit comprising:
    a descriptor prefetch circuit configured to receive descriptor request events, wherein the descriptor prefetch circuit comprises:
       a cache memory having a plurality of entries configured to store a plurality of descriptor lists;
       a global eviction timer configured to count down from a predetermined value responsive to a prior eviction event of a cache memory; and
       an eviction circuit configured to:
          monitor the global eviction timer;
          from the plurality of descriptor lists, determine a set of candidate descriptor lists, wherein the set of candidate descriptor lists includes one or more of the plurality of descriptor lists in a prefetch only state;
          detect an eviction event by detecting expiration of the global eviction timer and one or more eviction conditions, wherein the expiration of the global eviction timer indicates passage of a minimum amount of time since the prior eviction event;
          in response to detecting the eviction event, selecting a descriptor list from the set of candidate descriptor lists for eviction; and
          evict the selected descriptor list from the cache memory.

12. The direct memory access system of claim 11, wherein the global eviction timer is programmable.

13. The direct memory access system of claim 11, wherein the eviction circuit is configured to randomly select the selected descriptor list from the set of candidate descriptor lists.

14. The direct memory access system of claim 11, wherein the cache memory is a content addressable memory (CAM).

15. The direct memory access system of claim 11, wherein the eviction condition includes at least one of:
    determining that a number of free entries in a descriptor memory accessed by the direct memory access system is less than a threshold number of entries for the descriptor memory; or
    determining that a number of the plurality of entries of the cache memory in a prefetch mode is larger than a threshold number of entries having the prefetch mode enabled.

16. The direct memory access system of claim 11, further comprising a plurality of local eviction timers corresponding to the plurality of entries of the cache memory, wherein the eviction condition includes:
    determining that a local eviction timer of at least one descriptor list in the prefetch only state is expired;
    wherein the set of candidate descriptor lists includes only the descriptor lists in the prefetch only state having an expired local eviction timer.

17. The direct memory access system of claim 16, wherein the local eviction timer is started in response to the descriptor list entering the prefetch only state and is reset in response to the descriptor list exiting the prefetch only state or being evicted.

18. The direct memory access system of claim 16, wherein the local eviction timer is one of the plurality of local eviction timers that corresponds, on a one-to-one basis, with the plurality of entries of the cache memory.

* * * * *